United States Patent
Shacklett et al.

(10) Patent No.: US 6,274,236 B1
(45) Date of Patent: Aug. 14, 2001

(54) LABELS AND METHOD OF MAKING SAME

(75) Inventors: Dean R. Shacklett, Blue Bell, PA (US); Neil G. Sellars, Cinnaminson, NJ (US)

(73) Assignee: National Label Company, Lafayette Hill, PA (US)

( * ) Notice: Subject to any disclaimer, the term of this patent is extended or adjusted under 35 U.S.C. 154(b) by 0 days.

(21) Appl. No.: 09/232,121

(22) Filed: Jan. 15, 1999

Related U.S. Application Data

(60) Division of application No. 08/662,842, filed on Jun. 12, 1996, which is a continuation-in-part of application No. 08/489,611, filed on Jun. 12, 1995, now abandoned.

(51) Int. Cl.[7] .................... B32B 15/04; B32B 7/12
(52) U.S. Cl. ................ 428/354; 428/914; 156/227; 156/292
(58) Field of Search .................... 428/42.1, 43, 192, 428/177, 195, 198, 202, 203, 223, 343, 354, 411.1, 914; 156/227, 292; 281/2, 5

(56) References Cited

U.S. PATENT DOCUMENTS

| | | |
|---|---|---|
| Re. 34,366 | 9/1993 | Instance . |
| 4,323,608 | 4/1982 | Denny et al. . |
| 4,504,348 | 3/1985 | Instance . |
| 4,534,582 | 8/1985 | Howard . |
| 4,560,432 | 12/1985 | Instance . |
| 4,592,572 | 6/1986 | Instance . |
| 4,637,633 | 1/1987 | Instance . |
| 4,675,062 | 6/1987 | Instance . |
| 4,680,080 | 7/1987 | Instance . |
| 4,711,686 | 12/1987 | Instance . |
| 4,744,591 | 5/1988 | Instance . |
| 4,847,130 | 7/1989 | Cooper . |
| 4,849,043 | 7/1989 | Instance . |
| 4,850,613 | 7/1989 | Instance . |
| 4,888,078 | 12/1989 | Instance . |
| 4,894,106 | 1/1990 | Instance . |
| 4,930,812 | 6/1990 | Howard . |
| 4,933,043 | * 6/1990 | Instance ............... 156/248 |
| 5,031,938 | 7/1991 | Instance . |
| 5,174,605 | 12/1992 | Instance . |
| 5,222,766 | 6/1993 | Instance . |
| 5,262,214 | 11/1993 | Instance . |
| 5,399,403 | 3/1995 | Instance . |

* cited by examiner

Primary Examiner—Bruce H. Hess
Assistant Examiner—B. Shewareged
(74) Attorney, Agent, or Firm—Reed Smith LLP

(57) ABSTRACT

A pressure sensitive brochure label is both resealable and readily applicable to containers with sharp or small radius corners. The label comprises a pressure sensitive base label, a specially die cut brochure and a pressure sensitive overlayer, the overlayer serving to join the brochure to the base label, the base label and the brochure providing areas capable of carrying printing. The top leaf of the brochure projects beyond an edge of the base label and a portion of the overlayer projecting beyond the top leaf provides for sealing and resealing of the brochure in conjunction with a die cut tab on the brochure. In another embodiment, a relief notch in the base label in conjunction with the tab and portion of the overlayer which projects beyond the top leaf provides for sealing and resealing of the brochure. A method of making an adhesive brochure label assembly involves die cutting base label blanks from a base label web, applying a web-width brochure assembly over the base label blanks, applying an overlayer to the base label web and brochure assembly, and cutting the overlayer, brochure assembly and base label blanks to define the final outline of the brochure labels of the assembly.

2 Claims, 14 Drawing Sheets

LABELS AND METHOD OF MAKING SAME

CROSS REFERENCE TO A RELATED APPLICATION

The present application is a divisional of U.S. patent application Ser. No. 08/662,842 filed Jun. 12, 1996, which was a continuation-in-part of U.S. patent application Ser. No. 08/489,611, filed Jun. 12, 1995 abandoned.

BACKGROUND OF THE INVENTION

This invention relates to labels and, more particularly, to pressure sensitive labels of the kinds which may adhesively be secured to substrates, such as bottles or other containers, and which provide an integral brochure. In another of its aspects, this invention relates to a method of making such labels. In general, this invention relates to an improved label integrated with a printed brochure and a method of making such a label and an assembly of such labels carried on a flexible liner.

SUMMARY OF INVENTION

Labels which incorporate brochures or booklets have heretofore been proposed. Such labels, sometimes called "brochure labels," are useful for applications in which (1) it is expedient or necessary to provide with a packaged product detailed directions for usage; (2) regulatory requirements, as in the case of pharmaceuticals, make it necessary to provide with the product a great deal of explanatory information; and (3) it is desired to provide promotional or game materials with the product. Other applications will occur to those skilled in the art.

It is particularly desirable, from both practical and aesthetic points of view, that a brochure label be made "resealable," that is, so constructed and arranged that opening or use of the brochure associated with the label does not render impossible resealing of the brochure. A resealable brochure label may be restored to its initial appearance and condition after having been opened. It is also highly desirable that a brochure label be capable of neatly wrapping around the sharp or small radius corners of a square container. In such an application, the brochure must often be made to wrap around three or four corners, each of which provides a stress point for the brochure and an opportunity for highly undesirable local bunching or buckling. The present invention provides for a smooth and highly pleasing wrap.

Another desirable attribute in a brochure label is ease of opening and resealability. The present invention provides a simple and effective tab to facilitate opening, as well as capability of repeated resealing.

In some applications, it is necessary or desirable that the graphics and other aesthetic aspects of the brochure be integrated with those of the products labeled, so as to provide a uniform appearance and appeal. In prior art constructions, the label design has often been different from the brochure, imparting to the entire product the appearance of an "afterthought" rather than a well-integrated whole. In accordance with the present invention, the printing of the brochure component of a brochure label can be coordinated with that of the base label, using matched or coordinated materials or printing techniques, so that the base label and brochure provide the appearance of a unitary piece.

Finally, in some instances it is desirable that one or more leaves or pages of the brochure be made removable, or that provision be made for removability of the entire brochure at the user's option. As is explained below, suitable structural features may be provided within the purview of the present invention to achieve these desirable ends.

Labels in accordance with the present invention may be delivered to users in roll form and applied to packages in the same manner, using the same equipment, and at satisfactory production speeds (generally in excess of 200 bottles per minute) as standard pressure sensitive labels.

Accordingly, and in general, the present invention provides an adhesive label assembly which includes an integral brochure. The assembly comprises a pressure sensitive base label, adhesively and releasably supported by a flexible liner. A brochure is associated with the base label and is made up of a folded sheet providing panels, or pages, of the brochure. The brochure is positioned to overlie at least a portion of the base label, and the top panel of the brochure is made to project laterally beyond a lateral edge of the base label. The projecting portion of the top panel may provide a tab to facilitate opening of the brochure. A self-adhesive transparent overlayer is provided over the upper surface of the base label and also the top panel of the brochure. The overlayer is made to extend beyond an edge of the top panel, to facilitate sealing and resealing by adhesion of the overlayer to the container or other substrate to which the base label is applied or to a remote end portion of the base label. Alternatively, sealing and resealing of the overlayer may be accomplished by adhering the extended portion of the overlayer to a portion of the base label which extends beyond a bottom panel of the brochure. Regardless of the specific embodiment of the invention, the top panel may also provide a tab, which, in association with the projecting portion of the overlayer, provides both a means for sealing the brochure and a means for easily gripping the brochure to facilitate opening.

Optionally, perforations may be provided on one or more panels of the brochure, to facilitate ready removal of the page provided by that panel. Those skilled in the art will appreciate that the removed page may be or include a coupon, a premium, or a pre-printed request for additional information.

Optionally and alternatively, a line of perforations may be provided in the base label and overlayer, so that the consumer may remove the booklet without destroying the copy contained on the base label beneath it.

In still another of its aspects, the invention provides a method of making an adhesive label assembly of the kind having an integral brochure. The method comprises steps of: providing a pressure sensitive base label web comprising a base label sheet and a flexible liner releasably secured to the base label sheet; die cutting through the base label sheet but not the liner to form a blank for at least one and preferably two or more base labels; and stripping from the liner the material of the base label sheet other than the blank. Next, a brochure blank assembly, printed to provide multiple brochures, is mated to the base label web and so positioned that a top panel of the assembly projects laterally beyond what will be the lateral edge of the base label. Alternatively, at least a portion of the base label also extends beyond a bottom panel of the brochure. Next, there is applied over the liner, brochure blank assembly and base label an overlayer of self-adhesive material, the self-adhesive material serving to secure the brochure blank assembly to the base label blank and also adhering to the liner adjacent to the tab portion. Alternatively, where the base label extends beyond the bottom panel of the brochure, the overlayer self-adhesive material serves to secure the brochure blank assembly to the base label and also adhere to the extended portion of the base label.

Optionally, brochure blank assembly may be affixed to the base label by a suitable adhesive or by other affixation means. Die cutting through the overlayer and stripping of the waste yields the desired label assembly, with the individual labels releasably secured to the flexible liner.

BRIEF DESCRIPTION OF THE DRAWINGS

There are seen in the drawings forms of the invention which are presently preferred (and which constitute the best mode contemplated for carrying the invention into effect), but it should be understood that the invention is not limited to the precise arrangements and instrumentalities shown.

DESCRIPTION OF PREFERRED EMBODIMENTS

Figure 1:
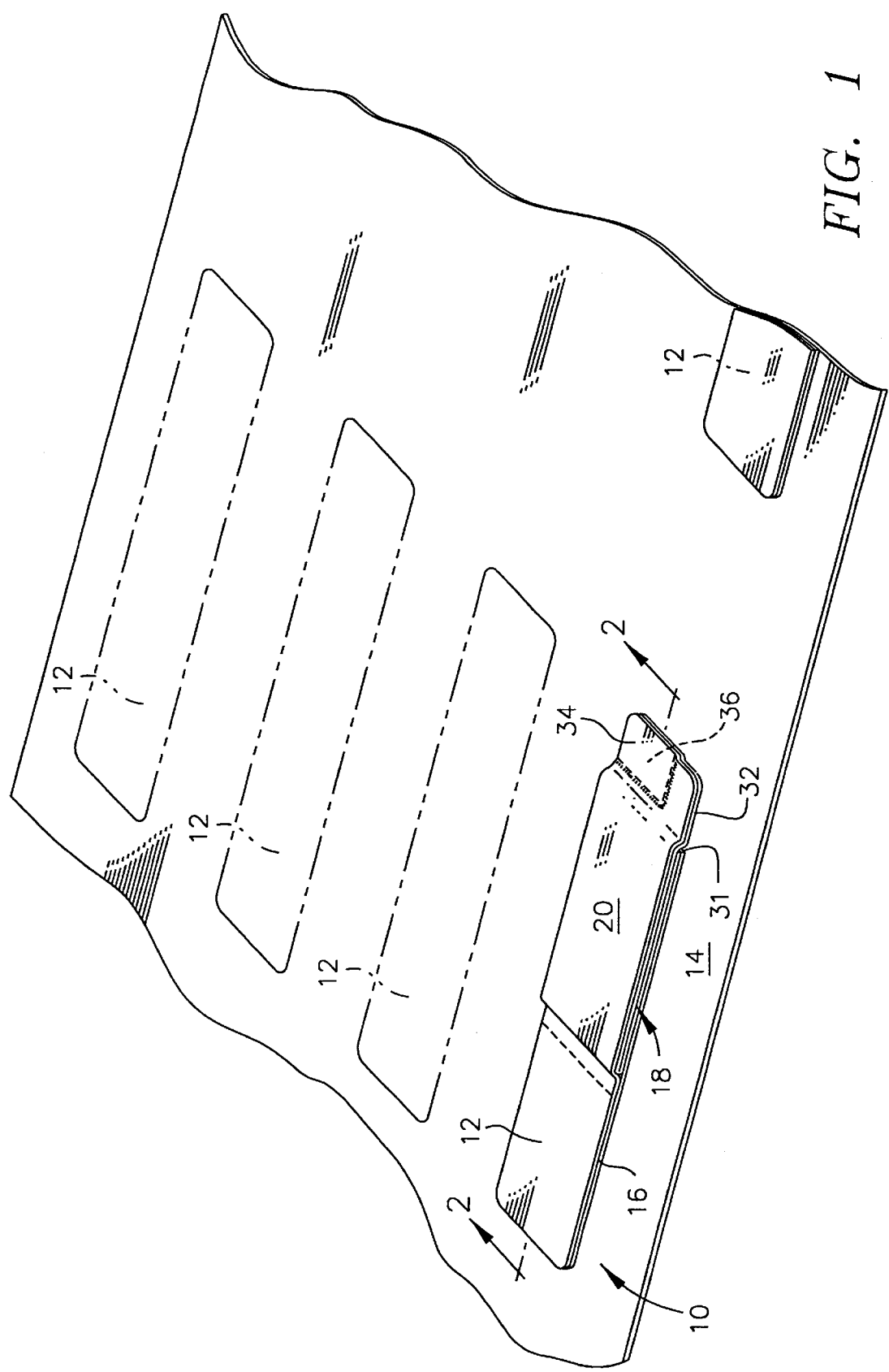
FIG. 1 is a pictorial view, in perspective, of a label assembly in accordance with the invention.

Referring now to the drawings in detail, wherein like reference numerals indicate like elements, there is seen in FIG. 1 a label assembly designated generally by the reference numeral 10. The label assembly 10 includes plural individual labels 12, disposed on a flexible liner 14. It should be understood that the thicknesses of the liner 14 and labels 12, as well as the various components which are laminated to make up the label 12, are exaggerated for clarity.

Figure 2:
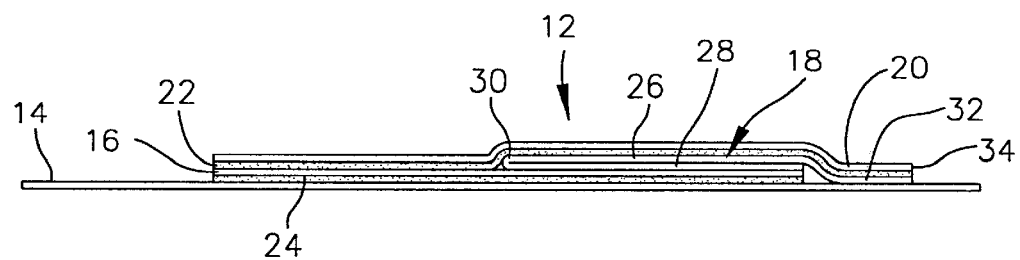
FIG. 2 is a cross-sectional view taken along the line 2—2 in FIG. 1.

Referring to FIGS. 1 and 2, an individual label 12 will be described in detail. The label 12 includes a base label 16, a brochure 18 and a transparent overlayer 20. Seen in FIG. 2 is an adhesive layer 22 by which the overlayer 20 is secured to the base label and the brochure 18 (and which, in turn, secures the brochure 18 to the base label 16), and an adhesive layer 24 which releasably secures the base label 16 to the liner 14.

Figure 12:
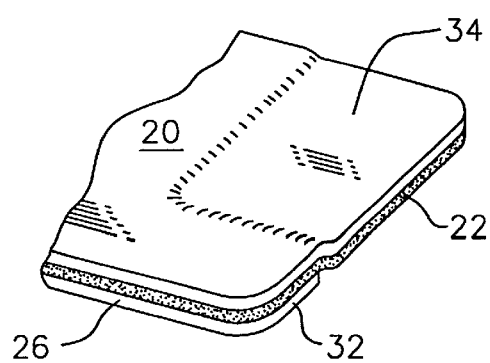
FIG. 12 is a detail view of a portion of a label in accordance with the invention.

The brochure 18 in FIGS. 1 and 2 is a leaflet which has two leaves 26 and 28, separated by a fold line 30. The top leaf 26, it will be seen, is wider than the bottom leaf 28, and thus extends further from the fold line 30 than does the bottom leaf 28. A portion of the top leaf 26 extends beyond the lateral edge 31 of the base label 16. As is perhaps best seen in FIG. 1 (and also in FIG. 12), a portion of the top leaf 26 is shaped to provide a tab 32, the purpose of which will be described shortly. As is also apparent in FIG. 1, a portion 34 of the overlayer 20 projects beyond a lateral edge 36 of the top leaf 26 in the vicinity of the tab 32, and is thus adhesively joined directly to the liner 14.

Figure 5:
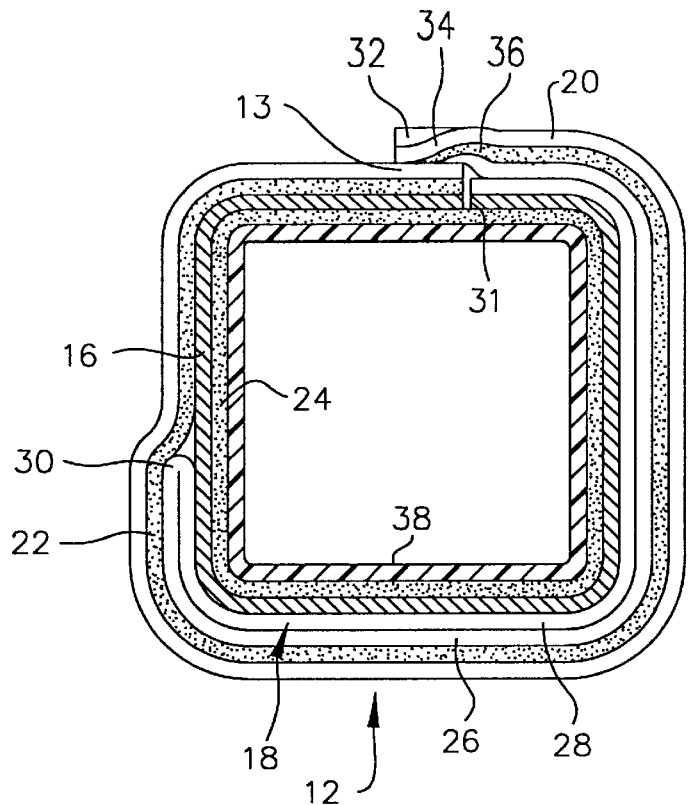
FIG. 5 is a top plan view, in cross-section, of an exemplary label in accordance with the invention, applied to a substrate in the form of a flat-sided container with small radius corners.

Referring now to FIG. 5, the manner in which a label such as the label 12 may be affixed to a substrate in the form of a container 38 is seen. In the example shown in FIG. 5, the container 38 is a round cornered square container. The label 12 wraps completely around the circumference of the container 38, without any bunching or buckling of the brochure 18 at the corners. This desirable result is achieved because, as described above, the top leaf 26 of the brochure 18 and the portion 34 of the overlayer 20 extend beyond the lateral edge 31 of the base label 16. In such an arrangement, the top leaf 26, with its associated overlayer 20 can be drawn tightly and smoothly during application of the label 12 to the container 38, thus enabling the adhesive 22 of the portion 34 to self-adhere (in the illustrated example) to a terminal portion 13 of the label 12. In other applications, such as the one shown in FIG. 5a (in which elements corresponding to those already described are designated by like, primed ('), reference numerals), the adhesive 22' of a portion 34' may adhere directly to a container 38'.

The tab 32 facilitates opening of the brochure, because it is interposed between the adhesive 22, 22' and, as the case may be, the terminal portion 13 of the label 12 or the container 38'. The tab 32 thus provides a convenient "handle" and an aid to opening of the brochure. On the other hand, the adhesive 22, 22' on the portions 34, 34' facilitates repeated resealing of the brochure as the contents of the containers 38, 38' are used.

Figure 5A:
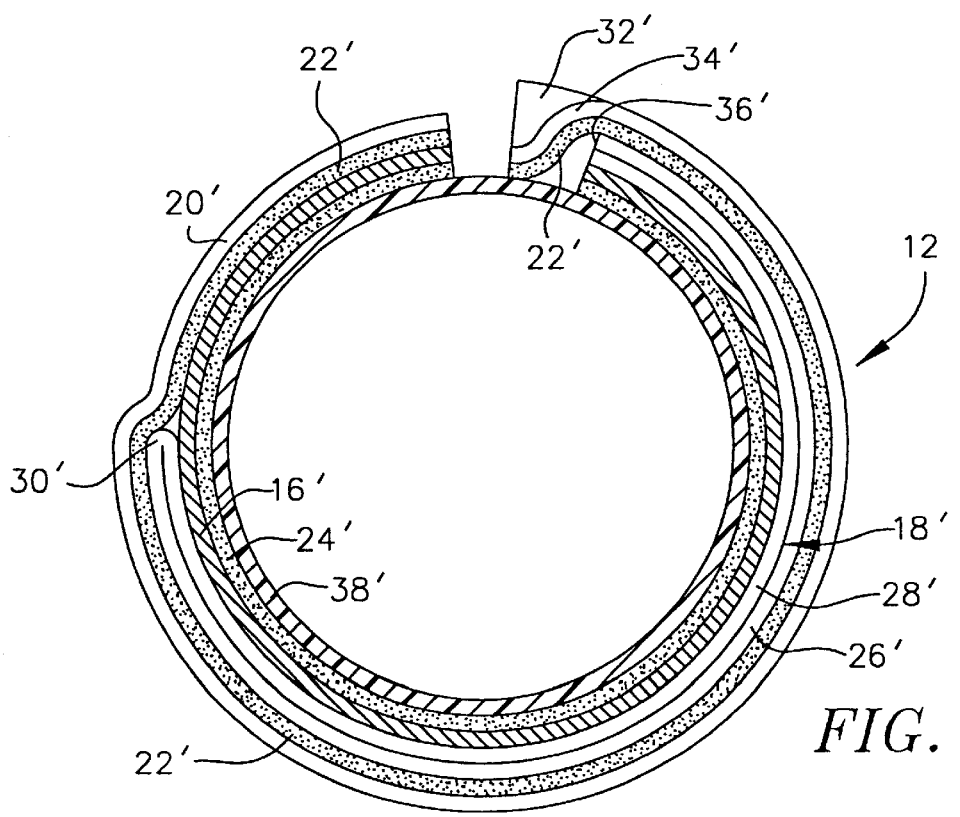
FIG. 5a is a top plan view similar to FIG. 5, also in cross-section, of another exemplary label in accordance with the invention, applied to a substrate in the form of a container of round cross-section.

It should be understood that the embodiments seen in FIGS. 5 and 5a are illustrative, and that a label applied as shown in FIG. 5 may be used to advantage on a round or otherwise shaped container or substrate, such as the round container 38 shown in FIG. 5a. Similarly, a label may be applied as shown in FIG. 5a to a square or rectangular container, such as the container 38 of FIG. 5.

The stock from which the base labels 16 are made is commercially available and familiar to those skilled in the art. It generally comprises a layer of paper, peelably joined by pressure sensitive adhesive to a liner of flexible plastic polymeric film.

The material for the overlayer 20 is also commercially available, and comprises a flexible clear plastic polymeric film, coated on one face with a clear pressure sensitive adhesive (which provides the adhesive 22, 22'). The top surface of the overlayer 20 may be treated in a known manner (as by having on it a release agent) to facilitate release and to avoid co-adhesion failure.

Referring now to FIGS. 1 and 6 through 11, a method of making an adhesive label assembly in accordance with the invention will be described.

In general, the method involves the following steps, each of which will be described in somewhat greater detail below: A brochure blank assembly 40 is created by printing, cutting and folding. The brochure blank assembly is prepared in full web width. A base label is printed, also in full web width. Next, the base label is die cut from a base label web 42 and, excess is stripped to base label blanks, each blank ultimately providing, in the presently preferred form of the method, two base labels. Next, the brochure blank assembly 40 is brought together with the die cut and stripped base label web, and a pressure sensitive overlayer 20 is applied over the exposed liner 14, the base label and brochure blank assembly, joining in the process the base label and brochure. No glue is required to assemble the base label and brochure, although glue may optionally be used in some embodiments. Finally, the assembled base label, brochure and overlayer are die cut to the final outline of the label, and waste is stripped to yield the final label assembly.

Figure 6:
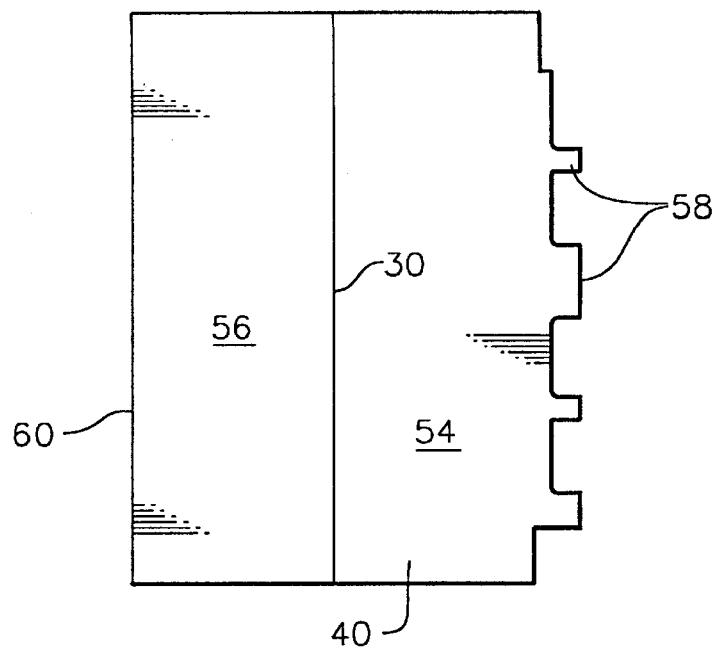
FIG. 6 is a plan view of a brochure blank for use in the invention.

Referring now to FIG. 6, the brochure blank assembly 40 may be created as follows: The brochure is printed by any suitable process, in the presently preferred process by sheet-fed offset printing in full web width (typically about twelve inches). Each sheet may contain multiple repetitions width wise. One presently preferred form of the process prints four wide. The portions of the blank assembly 40 which, with further trimming, will ultimately form the above-mentioned tabs 32, are preferably die cut, although other techniques may occur to those skilled in the art. The sheet is then trimmed to size and folded as desired, as at fold line 30 in FIG. 6.

Figure 8:
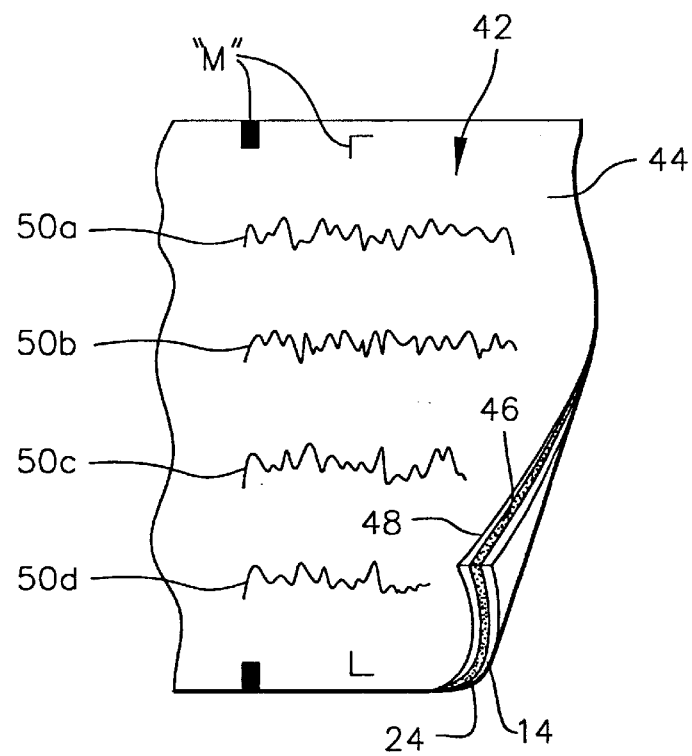
FIG. 8 depicts a portion of a base label web as used in the invention.

Referring now to FIG. 8, a base label web, designated generally by the reference numeral 42, a portion of which is seen in the Figure, is provided. The base label web is comprised of a base label sheet 44, of paper or other suitable material and liner 14 releasably adhered to the base label sheet 42. The base label web 42 has respective lower 46 and upper 48 faces, and has on its lower face a continuous layer 24 of adhesive which provides the above-mentioned adhesive layer 24 in the finished product. Printed matter suitable to the intended finished product may be applied to the upper face 48 of the base label sheet 44 by any suitable printing process. Suitable eye and machine-readable positioning, "eye" and registration marks "M" may also be printed on the base label sheet 44, to facilitate joining of the brochure blank assembly 40 with the base label web 42 (as described below) and other automated process steps. As is apparent in FIG. 8, printing of the base label sheet 44 is preferably done in full web width, providing multiple repetitions across the width of the web. The illustrated example provides four repetitions designated in the Figure as 50a–d.

Figure 9:
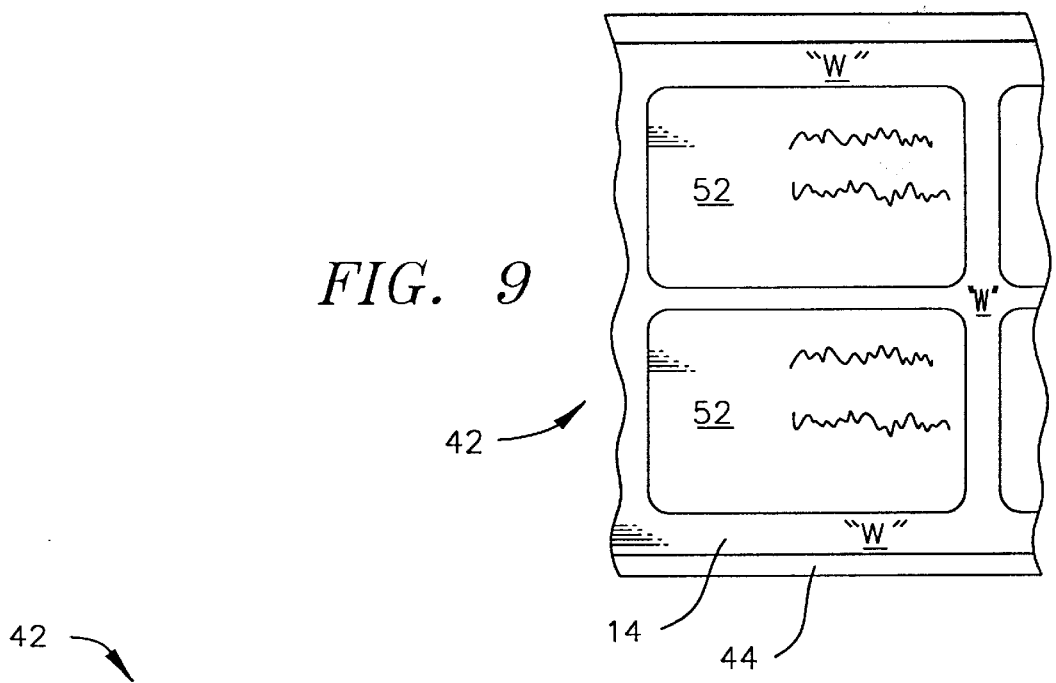
FIG. 9 depicts a base label web, die cut prior to stripping waste, to provide intermediate blanks for base labels in accordance with the invention.
Figure 9A:
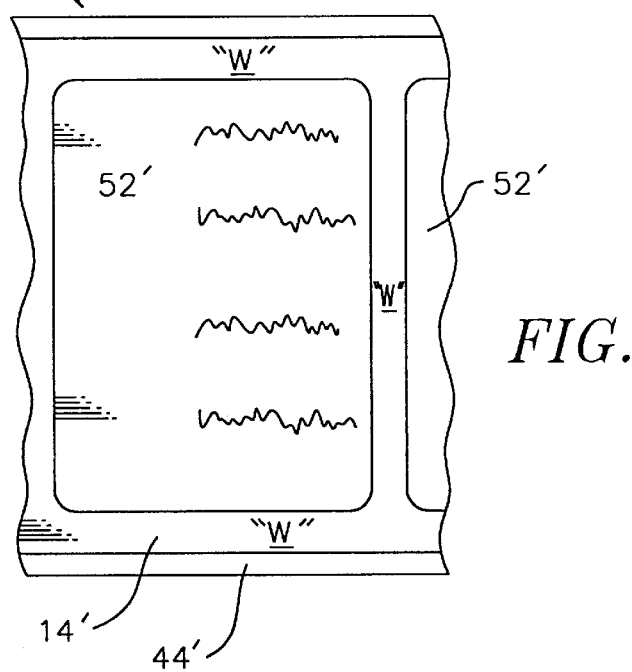
FIG. 9a depicts an alternative form of base label web.

FIGS. 9 and 9a depict alternative forms of the base label web 42 after die cutting through the base label sheet 44 (but not the liner 14) to form base label blanks 52. In FIG. 9, the die cutting operation provides two base label blanks 52, the width of each blank 52 enabling it to provide a base label 16 (FIG. 1) for two labels 12. In the alternative arrangement shown in FIG. 9a, a single base label blank 52' is provided, of a width enabling it to provide a base label 16 for four labels 12. Other equivalent arrangements will occur to those skilled in the art. After die cutting, waste material "W" around the base label blanks may be stripped from the base label web 42.

Figure 10:
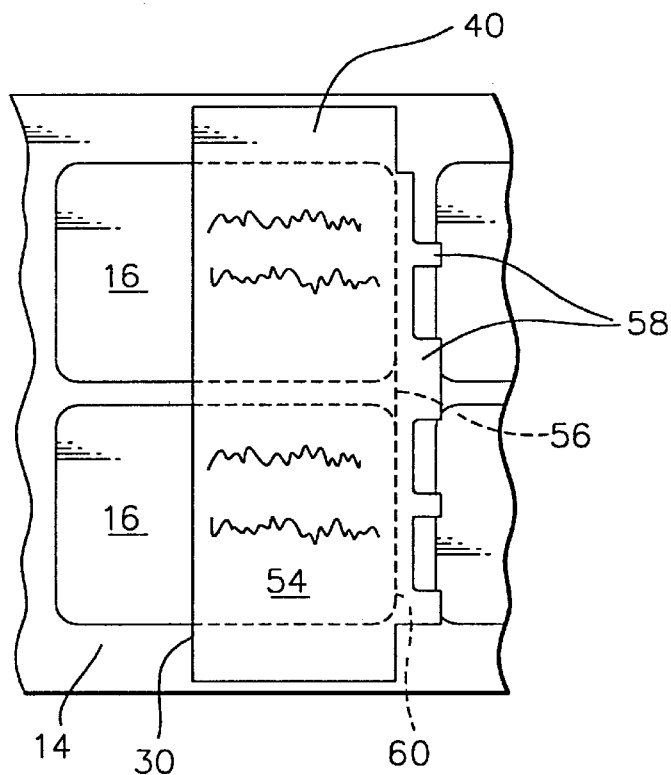
FIG. 10 is a plan view illustrating a brochure blank assembly associated with a base label web in accordance with the invention.
Figure 11:
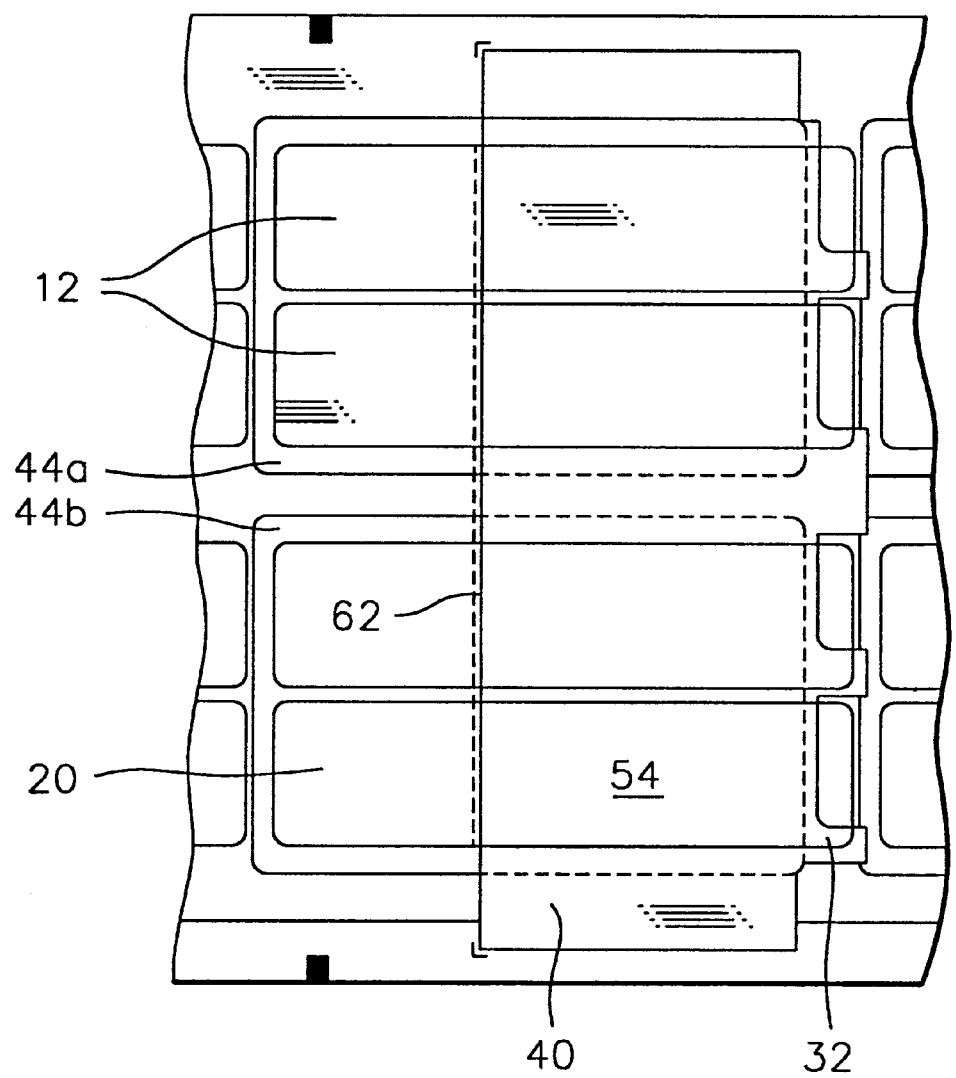
FIG. 11 is a view similar to FIG. 10, illustrating the step of die cutting to produce finished labels.

Referring now to FIGS. 10 and 11, the step of joining the brochure blank assembly 40 with the base label web 42 is illustrated. As is best seen in FIG. 10, the brochure blank assembly 40 is brought into juxtaposition with the base label web 42 in such a way that the fold 30 extends transversely with respect to the base label sheet 44. It will be recognized that this operation may be automated in ways familiar to those skilled in the art, drawing brochure blank assemblies 40, for example, from a hopper (not seen) and synchronizing the application of brochure blank assemblies 40 to a moving base label web 42. Folding of the brochure blank 40 is done in such a way as to provide an assembly having a top panel 54, which ultimately forms the abovementioned top leaves 26 of the brochures 18, and a bottom panel 56, which ultimately forms the bottom leaves 28 of the brochure 18. Associated with the top panel 54 are projections 58 which, after further cutting described below, form the tabs 32 associated with the top leaves 26. The top panel 54, it should be understood, extends from the fold line 30 a distance greater than the width of the bottom panel 56, so that when the brochure blank assembly 40 is positioned with respect to the base label web 42, the panel 54 projects beyond a lateral edge 60 of what will become the base label 16.

A continuous transparent overlayer 20 is next applied, by conventional laminating techniques, over the joined brochure blank assembly 40 and base label web 42, covering and adhering to the portions of the base label blanks 52 not covered by the brochure blank assembly 40, to the top panel 54 of the brochure blank 40, and to the remainder of the base label web 42.

Referring now to FIG. 11, the final die cutting step will now be described. In this step, the individual labels 12 are cut to their final external dimensions by cutting through the overlayer 20, the brochure blank assembly 40 and the base label blanks 52, but not the liner 14. This die cutting step establishes the final outline of the tabs 32 as well. Stripping from the liner 14 of the excess material (i.e., material outside the outline of the label as defined by the die) yields the label assembly 10 depicted in FIG. 1.

The overlayer 20 may also be perforated, as at 62 in FIG. 11, adjacent to the fold line 30 of the brochure blank assembly 40. Such a perforation facilitates selective ready removal of the entire brochure 18 from a label 12, by grasping of the brochure and tearing of the overlayer 20 along the perforation 62. The perforation 62 may be made as part of the final die cutting step described above, by die cutting through the overlayer 20.

Figure 3:
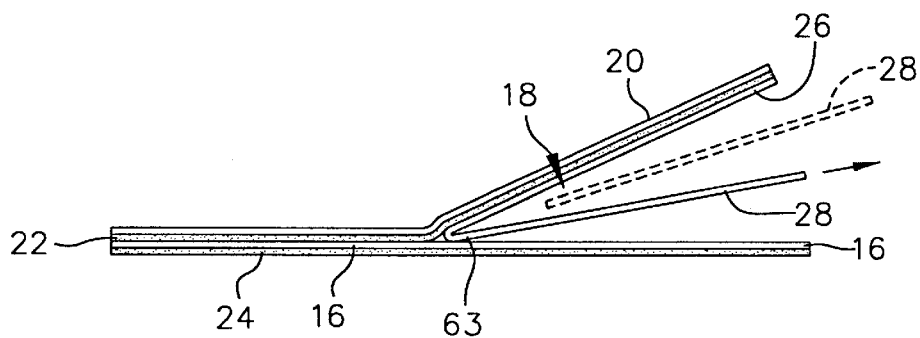
FIG. 3 is a cross-sectional view of a form of label in accordance with the invention.
Figure 4:
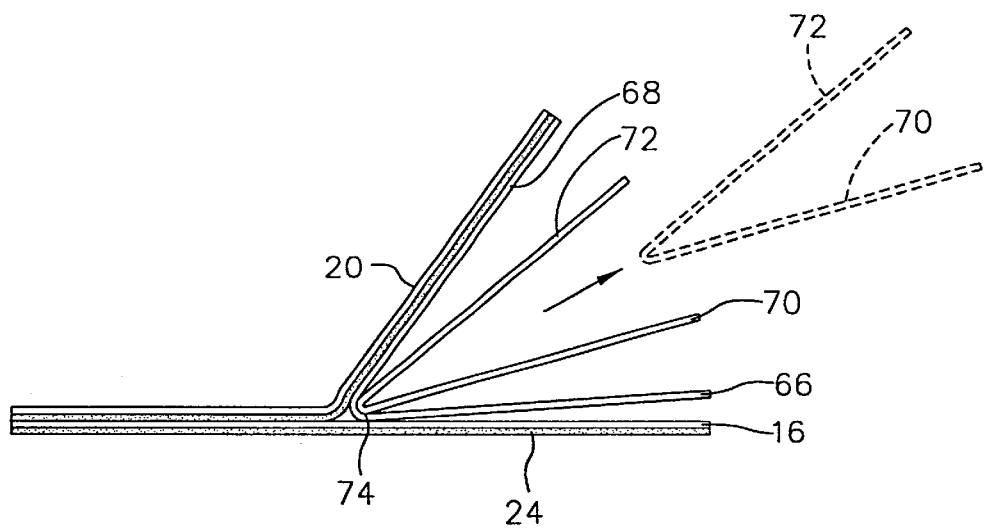
FIG. 4 is a cross-sectional view of another form of label in accordance with the invention.

FIGS. 3 and 4 illustrate particular features of various forms of labels in accordance with the invention. In FIG. 3, there is shown in dotted line the manner in which one of the leaves of the brochure may be removed, for use as a return coupon or a source of information. For this purpose, a line of perforations 63 may be provided across the leaf 28 in a direction transverse to the leaf, to facilitate removal of the leaf. The perforation 63 may be made during printing or die cutting of the brochure blank assembly from which the brochure 18 is made.

Figure 7:
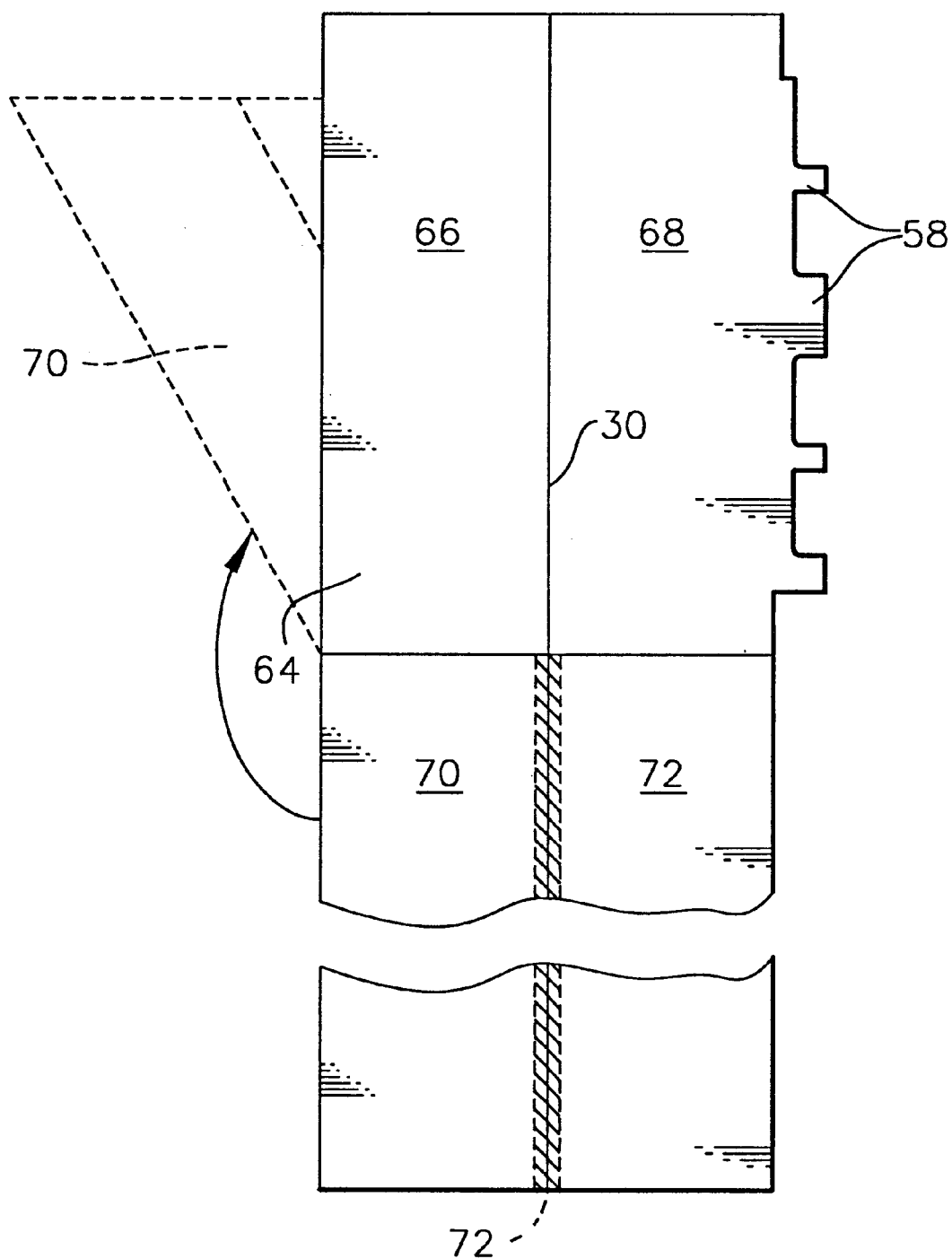
FIG. 7 is a plan view of a brochure blank for use in an alternative form of the invention.

FIGS. 4 and 7 illustrate aspects of an alternative form of the invention, which provides a potential for eight pages of text within a brochure made up of four leaves. In this embodiment a brochure blank 64, as seen in FIG. 7, is so folded as to provide respective panels 66, 68, 70 and 72. The panels 70 and 72, it will be understood, may be folded behind the panels 66 and 68, and the thus-folded blank 64 thereafter used in the manner described above in connection with the brochure blank assembly 40. Final die cutting in the manner described above yields from the panels 66–72 a total of 4 leaves.

It will be appreciated that in folding the brochure blank 64, a line of glue 74 may be applied to the blank 64, as illustrated in FIG. 7, to maintain the leaves provided by the panels 70 and 72 in position relative to the other panels after the final die cutting step. The glue 74 may be applied in a conventional manner before the folding step. As is apparent from FIG. 4, with this embodiment, one pair of leaves may, if desired, be extracted from the brochure as a return coupon or informational piece.

Figure 13:
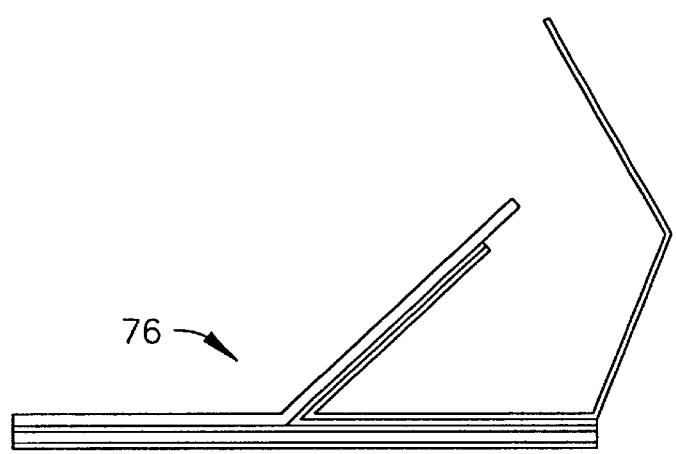
FIG. 13 is a cross-sectional view of yet another form of label in accordance with the invention.

Those skilled in the art will appreciate that although the above-described embodiments of the brochure are "book-like" in the sense that they have leaves joined at a spine (defined by a fold line), it is within the purview of the invention to provide a brochure whose panels are joined by spaced parallel fold lines. Such an embodiment of the invention is seen in FIG. 13 and designated generally by reference numeral 76.

Figure 14:
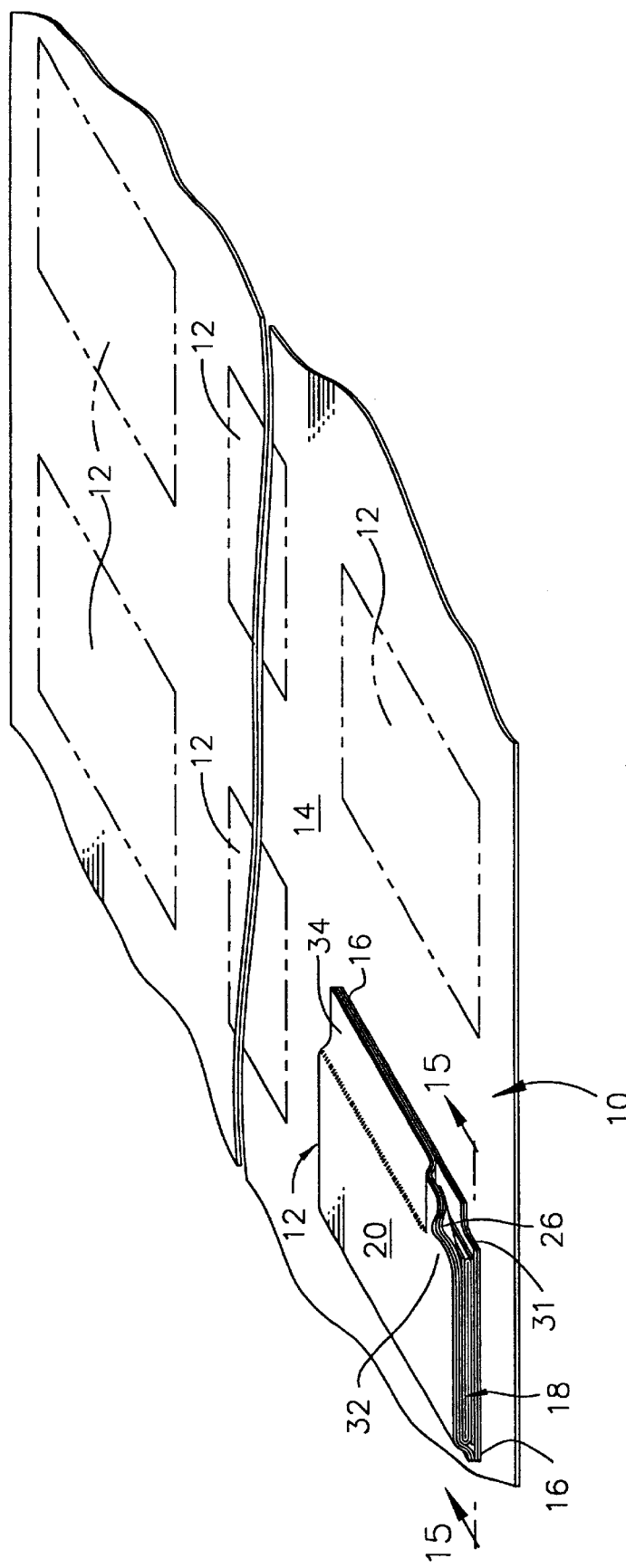
FIG. 14 is a pictorial view, in perspective, of another form of the label assembly in accordance with the invention.
Figure 15:
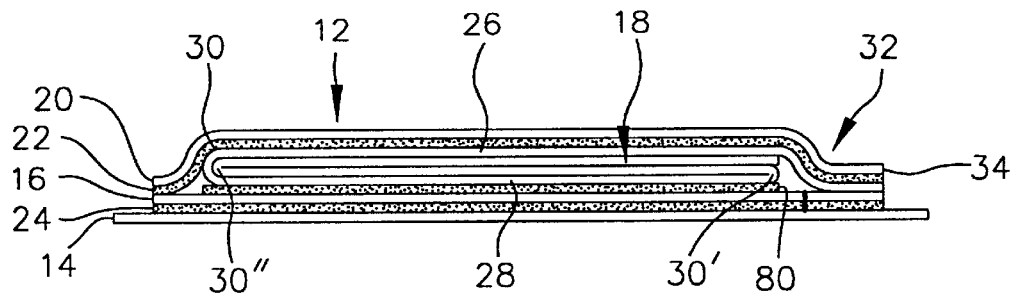
FIG. 15 is a cross-sectional view taken along the line 15—15 in FIG. 14 of a label of this invention in a closed position.

FIGS. 14 through 20 depict yet another embodiment of this invention. Referring to FIGS. 14 and 15, label 12 comprises base label 16, brochure 18 and overlayer 20. Brochure 18 may comprise any number of panels as exemplified by the seven panel construction depicted in FIGS. 14, 15, 16 and 17. Seen in FIG. 15 is adhesive layer 22 by which overlayer 20 is secured to top leaf 26 of brochure 18 and base label 16, an adhesive layer 80 which secures bottom leaf 28 of brochure 18 to base label 16, and adhesive layer 24 which releasably secures base label 16 to liner 14.

Figure 16:
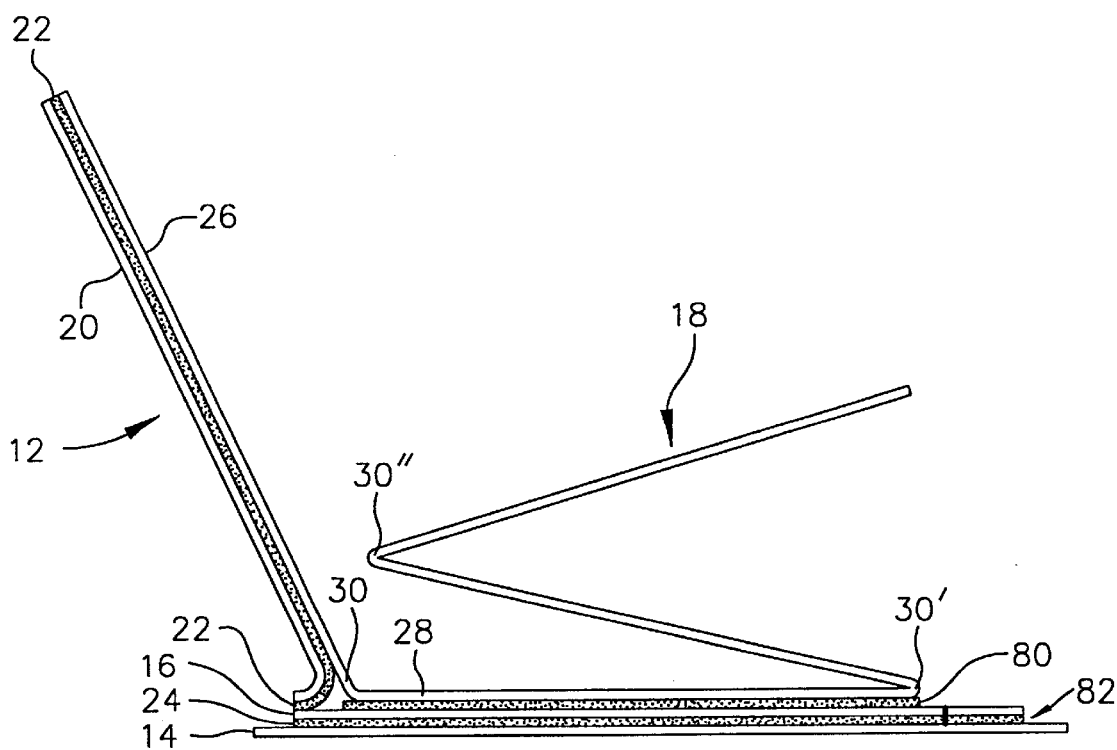
FIG. 16 is a cross-sectional view taken along the line 15—15 in FIG. 14 of a label of this invention in an open position.

Although brochure 18 in FIGS. 14, 15, 16, and 17 is a leaflet which is formed or folded to provide seven printed surfaces or "panels," it will be apparent to those skilled in the art that label 12 may accommodate numerous configurations of brochure 18. In the embodiment of FIGS. 14, 15, 16 and 17, fold line 30 separates leaves 26 and 28. Fold line 30 also forms an area in which the additional panels of brochure 18 may be folded (for example along fold lines 30' and 30" as shown in FIGS. 15 and 16) and inserted between leaves 26 and 28 when label 12 is in the closed position.

Top leaf 26 is wider than bottom leaf 28, and thus extends further from fold line 30 than does bottom leaf 28. Additionally, a portion of top leaf 26 designated as area 32 in FIGS. 14, 15 and 17 extend beyond lateral edge 31 of base label 16 shown in FIG. 14.

As will be apparent to those skilled in the art, label 12 as depicted in FIGS. 14, 15, 16 and 17 may be affixed to containers with various cross-sections including, but not limited to, containers 38 shown in FIGS. 5 and 5a. Generally, label 12 may take numerous shapes and may be adhered to the entire surface area of container 38, such as container 38 shown in FIG. 5a. For example, label 12 of FIG. 14 could be adhered to any one of the four sides of container 38 shown in FIG. 5. Alternatively, label 12 could be adhered to any two sides and any corner of container 38.

Figure 17:
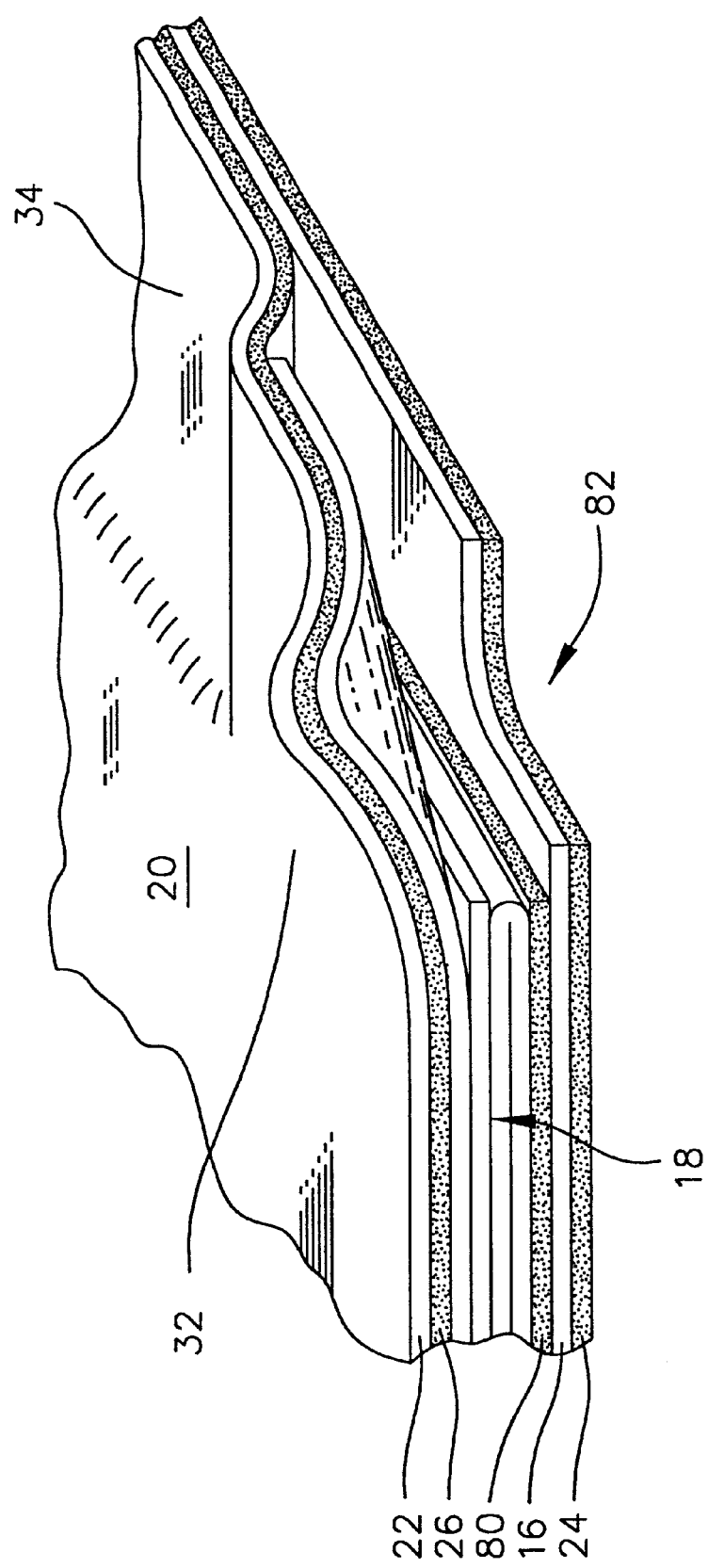
FIG. 17 is a detail view of a portion of the label of FIG. 14.

Tab 32 of label 12 depicted in FIGS. 14, 15, and 17 (shown with a corner turned upward in order to demonstrate the flexibility of tab 32) facilitates the opening of the brochure because it is interposed between leaf 26 of brochure 18 and container 38, and further, because of notched opening 82 in base label 16. When applied to container 38, relief notch 82 creates a space between leaf 26 and the substrate (such as container 38) to which label 12 is affixed. Tab 32 thus provides a convenient "handle" and an aid to gaining access to brochure 18. On the other hand, as best shown in FIG. 17, adhesive 22 present on portion 34 of overlayer 20 facilitates repeated unsealing and resealing of brochure 18 as container 38 is used.

The materials used in the construction of this embodiment of the invention depicted in FIGS. 14, 15, 16 and 17 may be the same as used in the construction of other embodiments of this invention. In addition, adhesive 80 may be any material suitable for adhering brochure 18 to base label 16 and preferably is a cold glue.

Referring now to FIGS. 14 and 18 through 20, a method of making an adhesive label assembly in accordance with the instant embodiment of label 12 will be described.

In general, the method involves the following steps, each of which will be described in greater detail below: brochure blank assembly 40 is created by printing, cutting and folding. Brochure blank assembly 40 is prepared in full web width. Base label 16 is printed, also in full web width. Next, base label 16 is die cut from base label web 42 (which, in part, forms relief notch 82) and excess waste (depicted in the accompanying figures as "W") is stripped from base label blanks 52, each blank ultimately providing, in the presently preferred form of the method, three base labels 16. Next, brochure blank assembly 40 is affixed to base label blank 52 by applying adhesive 80 to base label blank 52 and joining brochure blank assembly 40 to adhesive 80. Although in this embodiment adhesive 80 is generally necessary if brochure 18 is to remain affixed to base base label 16, it is not necessary to use adhesive 80 if brochure 18 is to be completely removed from label 12. Overlayer 20 is then applied over exposed liner 14, base label blank 52, and brochure blank assembly 40. Finally, base label blank 52, brochure assembly 40 and overlayer 20 are die cut to final outline 86 of label 12, and waste "W" is stripped to yield the final label assembly.

Figure 18:
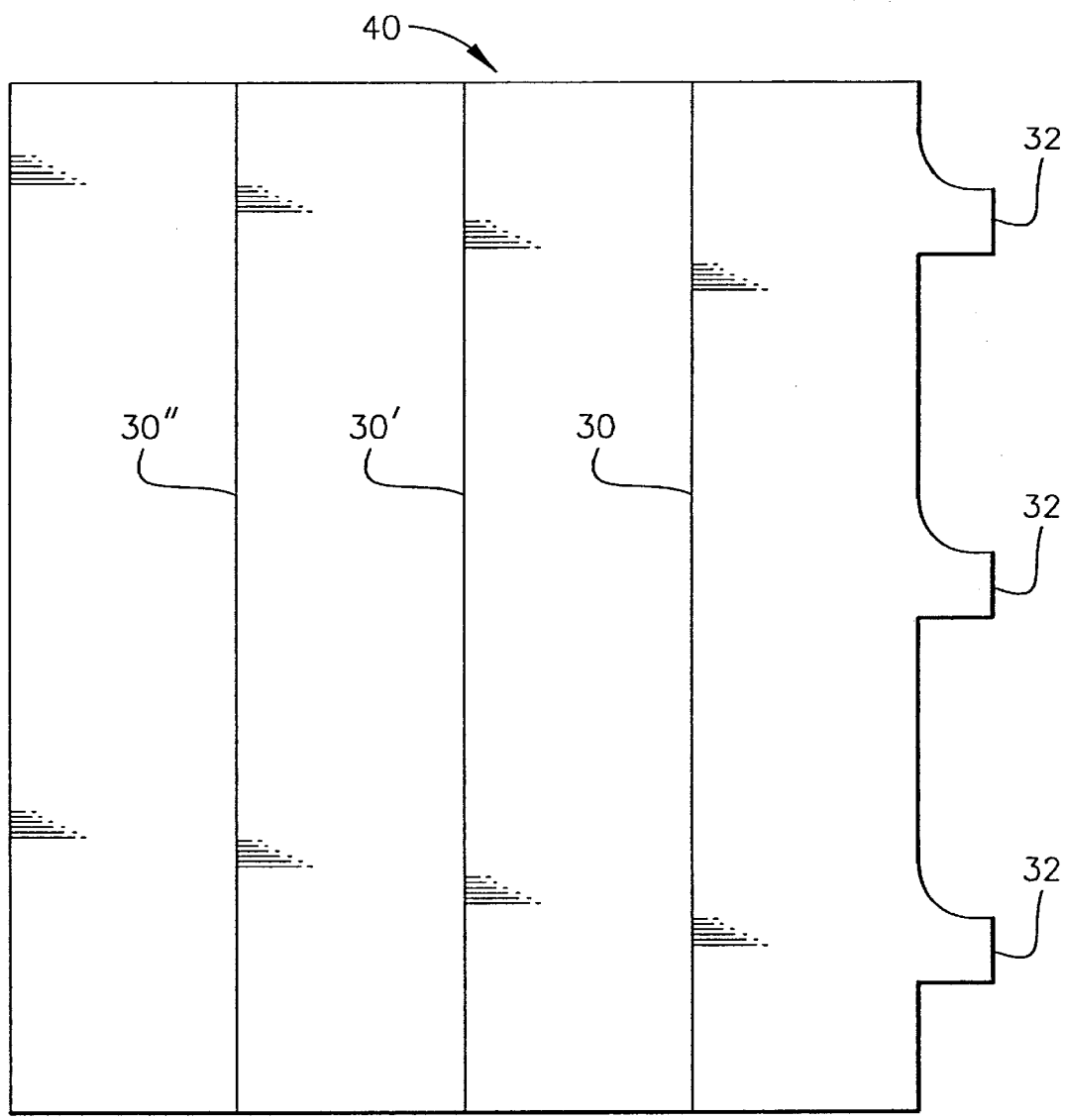
FIG. 18 is a plan view of a brochure blank for use with the label of FIG. 14.

Referring now to FIG. 18, brochure blank assembly 40 may be created as follows: brochure blanks are printed by any suitable process. In the presently preferred process, brochure blank 40 is printed by sheetfed offset printing in full sheets (typically about twenty-four inches wide) and which are cut in half to form a full web width (typically about approximately twelve inches). Each full web width may contain multiple repetitions of printed matter. One presently preferred form of the process prints on each full web width three brochures 18. Optionally, brochures may be printed on one or both sides of brochure blank assembly 40. The portions of brochure blank assembly 40 which, with further trimming, will ultimately form tabs 32 of the embodiment of FIGS. 14, 15, 16 and 17, are preferably die cut, although other techniques may occur to those skilled in the art. The full web width is then trimmed to size and folded as desired, such as at fold lines 30, 30' and 30" depicted in FIG. 18.

Figure 19:
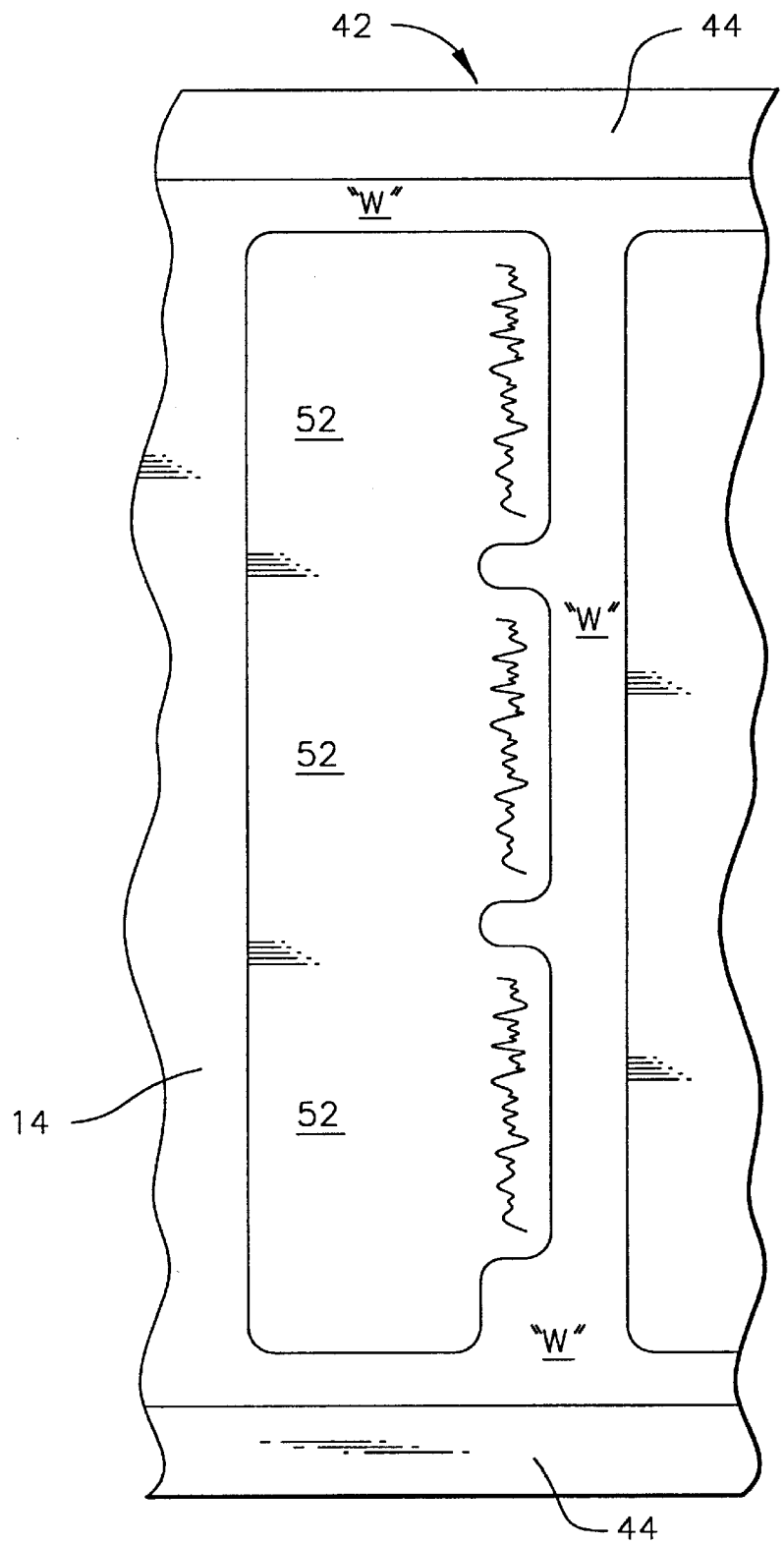
FIG. 19 depicts a base label web, die cut prior to stripping waste, to provide intermediate blanks for base labels in accordance with the invention.

Turning now to FIG. 19, base label web 42 of this embodiment is preferably printed as disclosed above except that three rather than four repetitions are preferably printed across base label web 24, although other repetitions are possible.

FIG. 19 depicts a form of base label web 42 after die cutting through base label sheet 44 (but not liner 14) to form three attached base label blanks 52. The die cutting operation of FIG. 19 provides three attached base label blanks 52, which blanks 52 are to be separated in a later step in the process. The width of each blank 52 enables it to provide a base label 16 for three labels 12. Other equivalent arrangements will occur in those skilled in the art. After die cutting, the waste material "W" around base label blanks 52 may be stripped from base label web 42.

Figure 20:
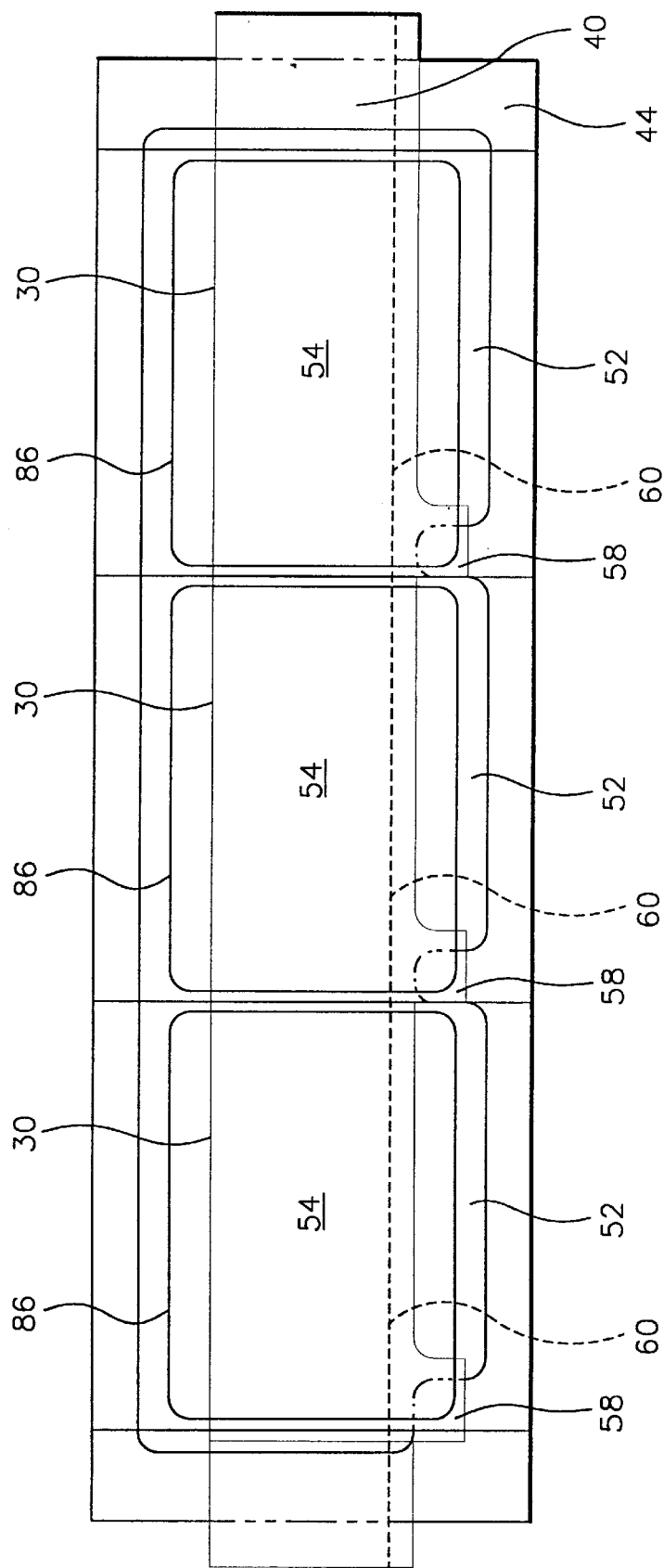
FIG. 20 is a plan view illustrating the brochure blank assembly associated with the base label web in accordance with the label of FIG. 14.

Referring now to FIG. 20, the step of joining the brochure blank assembly 40 with base label web 42 is illustrated. First, adhesive 80 is applied to a section of each label blank 52 at which section brochure blank assembly 40 will be applied to label blank 52. Adhesive 80 may be applied by any means shown in the art but preferably adhesive 80 will be applied to base label blanks 52 in a continuous area approximately the size and shape of brochure blank assembly 40. Alternatively, adhesive 80 may be applied to the underside of brochure leaf 28.

After application of adhesive 80, brochure blank assembly 40 is brought into juxtaposition with base label web 42 in such a way that fold 30 extends transversely with respect to base label sheet 44. It will be recognized that this operation may be automated in ways described above with respect to the embodiment of the invention described herein. Folding of brochure label 40 is done in such a way as to provide an assembly having a top panel 54, which ultimately forms the above-mentioned top leaves 26 of brochures 18, and bottom panels 56 (not shown in FIG. 20), which ultimately forms bottom leaves 28 of brochure 18. Associated with top panel 54 are projections 58 which, after further cutting described below, form tabs 32 associated with top leaves 26. Top panel 54, it should be understood, extends from fold line 30 a distance greater than the width of bottom panel 56, so that when brochure blank assembly 40 is positioned with respect to base label web 42, panel 54 projects beyond lateral edge 60 of what is fold 30' such that top panel 54 may contact at least a portion of label blank 52.

A continuous transparent overlayer 20 is next applied, by conventional laminating techniques, over joined brochure blank assembly 40 and base label web 42, covering and adhering to the portions of base label blanks 52 not covered by brochure blank assembly 40, to top panel 54 of brochure blank 40, and the remainder of the base label web 42.

The final die cutting step is substantially as described with respect to other embodiments of this invention. In this step, individual labels 12 are cut to the final external dimensions. This die cutting step establishes a final label outline 86 of label 12 (including tab 32) as depicted in FIG. 20. Stripping from liner 14 of excess material (i.e., material outside final label outline 86) yields label assembly 10 depicted in FIG. 14.

The present invention may be embodied in other specific forms without departing from its spirit or essential attributes. Accordingly, reference should be made to the appended claims rather than the foregoing specification as indicating the scope of the invention.

We claim:

1. A method of making an adhesive label assembly having an integral resealable brochure, comprising the steps of:
   (a) providing a base label having a relief notch therethrough and upper and lower faces, said lower face having thereon an adhesive;
   (b) providing a brochure blank assembly comprising at least one sheet elements, said sheet element having a lateral edge and a tab portion projecting from said lateral edge;
   (c) aligning said brochure assembly with said base label such that said tab is adjacent said relief notch; and
   (d) applying over said brochure blank assembly and said base layer an overlayer comprising a resealable adhesive material, wherein said overlayer is secured to said base layer, said brochure assembly and said tab such that said overlayer releasably detaches from said base layer providing access to said brochure.

2. An adhesive label assembly with integral resealable brochure, comprising;
   a base label having a relief notch therethrough and upper and lower faces, said lower face having thereon an adhesive;
   a brochure having upper and lower faces and comprising at least one sheet element, said sheet element having a lateral edge and a tab portion projecting from said lateral edge, said brochure being affixed to said upper face of said base label such that said tab is adjacent to said relief notch; and
   an overlayer affixed to said upper face of said brochure, said overlayer having a projection which projects beyond said lateral edge of said brochure when said projection is releasably affixed to said upper face of said base label so as to allow for the sealing and resealing of said brochure.

* * * * *

UNITED STATES PATENT AND TRADEMARK OFFICE
CERTIFICATE OF CORRECTION

PATENT NO.    : 6,274,236 B1
DATED         : August 14, 2001
INVENTOR(S)   : Dean R. Shacklett; Neil G. Sellars It is certified that error appears in the above-identified patent and that said Letters Patent is hereby corrected as shown below:

<u>Column 10, claim 1,</u>
Line 17, "elements" should be -- element --.

Signed and Sealed this

Twenty-sixth Day of February, 2002

Attest:

JAMES E. ROGAN
*Attesting Officer*           *Director of the United States Patent and Trademark Office*